US012670033B2

(12) United States Patent
Patel et al.

(10) Patent No.: US 12,670,033 B2
(45) Date of Patent: Jun. 30, 2026

(54) MULTI-TIERED HYBRID MULTI-CLOUD SERVICE MANAGEMENT ARCHITECTURE

(71) Applicant: International Business Machines Corporation, Armonk, NY (US)

(72) Inventors: Kushal S. Patel, Pune (IN); Gandhi Sivakumar, Bentleigh (AU); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 18/212,532

(22) Filed: Jun. 21, 2023

(65) Prior Publication Data

US 2024/0427639 A1    Dec. 26, 2024

(51) Int. Cl.
*G06F 9/50* (2006.01)
*H04L 41/50* (2022.01)
*H04L 67/51* (2022.01)

(52) U.S. Cl.
CPC .......... *G06F 9/5072* (2013.01); *G06F 9/5044* (2013.01); *G06F 9/505* (2013.01);
(Continued)

(58) Field of Classification Search
None
See application file for complete search history.

(56) References Cited

U.S. PATENT DOCUMENTS 8,954,741 B2    2/2015  Suh et al.
8,988,998 B2    3/2015  Adam et al.
(Continued)

FOREIGN PATENT DOCUMENTS

CN    115242792  A    10/2022
CN    121195242  A    12/2025
(Continued)

OTHER PUBLICATIONS

Gupta et al., "Performance Evaluation of Multi-Cloud Management and Control Systems", Apr. 1, 2016, Bentham Science, Recent Advances in Communications and Networking Technology, vol. 5, No. 1, pp. 9-18. (Year: 2016).*
(Continued)

*Primary Examiner* — Qing Yuan Wu

(57)    ABSTRACT

An embodiment detects an inter-cloud service negotiation between a plurality of cloud environments, the inter-cloud service negotiation indicating an interaction between the plurality of cloud environments. The embodiment identifies a plurality of local controllers in the plurality of cloud environments, a local controller in the plurality of local controllers being a computer control node configured to manage resources associated a cloud environment in the plurality of cloud environments including a worker, and the worker being a computer execution node configured to execute tasks using resources associated with the cloud environment. The embodiment selects a local controller from among the plurality of local controllers based on a performance metric of the local controller. The embodiment designates the selected local controller as a super controller, the super controller being configured to manage resources associated the plurality of cloud environments including the plurality of local controllers.

23 Claims, 9 Drawing Sheets

(52) U.S. Cl.
　　CPC ............ *G06F 9/5055* (2013.01); *H04L 67/51*
　　　　　　　　(2022.05); *H04L 41/5058* (2013.01)

(56) References Cited

U.S. PATENT DOCUMENTS

| | | |
|---|---|---|
| 9,075,663 B2 | 7/2015 | Zhang et al. |
| 10,244,081 B2 | 3/2019 | Ananthanarayanan et al. |
| 10,827,008 B2 | 11/2020 | Pogrebinsky et al. |
| 2014/0075319 A1 | 3/2014 | Kuo |
| 2014/0372533 A1 | 12/2014 | Fu et al. |
| 2015/0263894 A1 | 9/2015 | Kasturi et al. |
| 2016/0366233 A1 | 12/2016 | Le et al. |
| 2020/0050494 A1 | 2/2020 | Bartfai-Walcott et al. |
| 2021/0019194 A1 | 1/2021 | Bahl et al. |

FOREIGN PATENT DOCUMENTS

| | | | |
|---|---|---|---|
| KR | 101763132 B1 | 7/2017 | |
| WO | 2024/260690 A1 | 12/2024 | |

OTHER PUBLICATIONS

Ouchaou et al., Towards a distributed SaaS management system in a multi-cloud environment, Jun. 20, 2022.
Paraiso et al., soCloud: A service-oriented component-based PaaS for managing portability, provisioning, elasticity, and high availability across multiple clouds, Jul. 8, 2014.
International Searching Authority, PCT/EP2024/064719, Aug. 8, 2024.
"IBM Cloud Satellite", IBM, Jun. 2023, 9 pages, doi: https://www.ibm.com/products/satellite.
ip.com, Method and Apparatus for Discovery Protocol for Multicloud Architecture, Sep. 2, 2022.
Vallim, Kubernetes Journey—Up and running out of the cloud—Master and Worker, Jun. 17, 2019, https://itnext.io/kubernetes-journey-up-and-running-out-of-the-cloud-master-and-worker-6328775b347f.

* cited by examiner

800

START

DETECT AN INTER-CLOUD SERVICE NEGOTIATION BETWEEN A PLURALITY OF CLOUD ENVIRONMENTS
802

IDENTIFY A PLURALITY OF LOCAL CONTROLLERS IN THE PLURALITY OF CLOUD ENVIRONMENTS
804

SELECT A LOCAL CONTROLLER FROM AMONG THE PLURALITY OF LOCAL CONTROLLERS
806

DESIGNATE THE SELECTED LOCAL CONTROLLER AS A SUPER CONTROLLER
808

END

*Fig. 9*

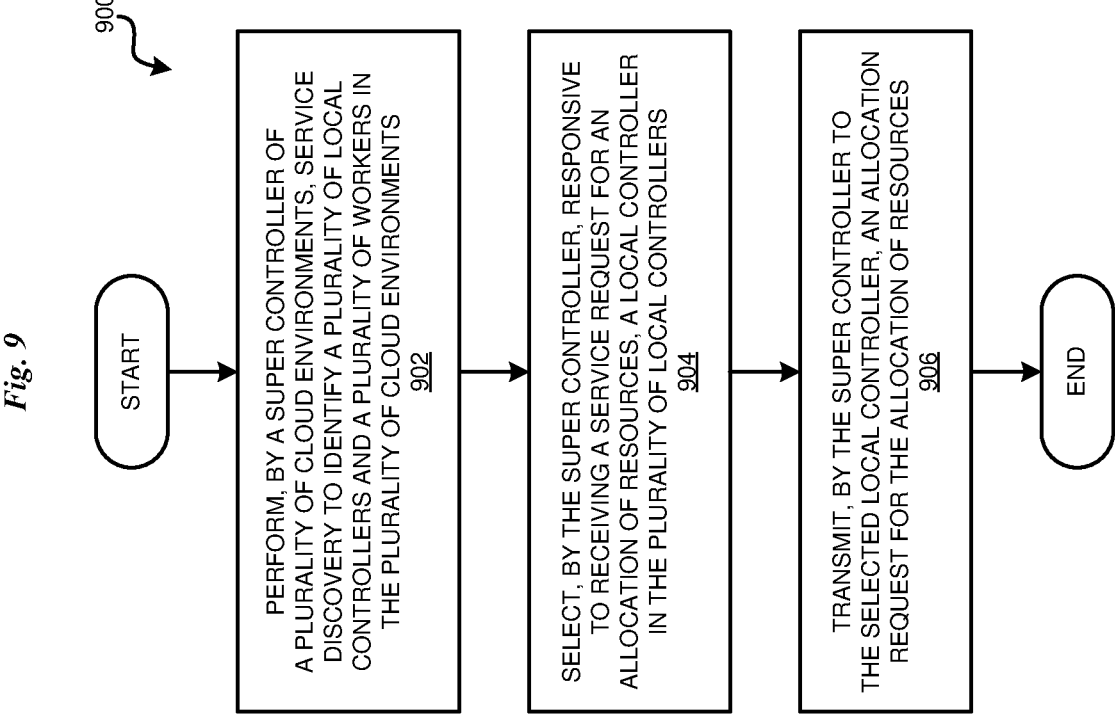

900

START

PERFORM, BY A SUPER CONTROLLER OF A PLURALITY OF CLOUD ENVIRONMENTS, SERVICE DISCOVERY TO IDENTIFY A PLURALITY OF LOCAL CONTROLLERS AND A PLURALITY OF WORKERS IN THE PLURALITY OF CLOUD ENVIRONMENTS
902

SELECT, BY THE SUPER CONTROLLER, RESPONSIVE TO RECEIVING A SERVICE REQUEST FOR AN ALLOCATION OF RESOURCES, A LOCAL CONTROLLER IN THE PLURALITY OF LOCAL CONTROLLERS
904

TRANSMIT, BY THE SUPER CONTROLLER TO THE SELECTED LOCAL CONTROLLER, AN ALLOCATION REQUEST FOR THE ALLOCATION OF RESOURCES
906

END

MULTI-TIERED HYBRID MULTI-CLOUD SERVICE MANAGEMENT ARCHITECTURE

BACKGROUND

The present invention relates generally to network management. More particularly, the present invention relates to a method, system, and computer program for multi-tiered multi-cloud service management.

Hybrid cloud technology, which merges private (either on-premises or hosted in a colocation facility) and public cloud infrastructure, has significantly evolved in recent years. The present trend of deploying hybrid cloud and multi-cloud strategies is akin to achieving near-universal usage among modern enterprises. This evolution can be attributed to the pursuit of bypassing vendor lock-in, capitalizing on top-tier solutions, or sometimes inadvertently as a consequence of "shadow IT," which occurs when the information technology systems, solutions, software, or hardware that are managed and utilized without the knowledge or explicit approval of the organization's IT department.

A multi-cloud approach—also referred to simply as a cloud network—is a composite structure made up of a variety of interconnected elements (cloud providers), which process information in response to organizational demands. Multi-cloud infrastructures serve as processing devices (algorithms and/or platforms) that are designed following the interconnected nature of networks but on a different magnitude. A large multi-cloud setup might span across several cloud providers, whereas a single enterprise could potentially manage billions of workloads with a corresponding increase in the complexity of their overall interaction and emergent behavior.

SUMMARY

The illustrative embodiments provide for managing a multi-tier hybrid multi-cloud environment.

According to an aspect of the invention, an embodiment includes detecting, by a multi-cloud service manager, an inter-cloud service negotiation between a plurality of cloud environments, the inter-cloud service negotiation indicating an interaction between the plurality of cloud environments. Detecting an inter-cloud service negotiation between a plurality of cloud environments may enable the multi-cloud service manager to understand the distribution of resources and tasks across the plurality of cloud environments, facilitating more efficient management of these resources.

The embodiment also includes identifying, by the multi-cloud service manager, a plurality of local controllers in the plurality of cloud environments, a local controller in the plurality of local controllers being a computer control node configured to manage resources associated a cloud environment in the plurality of cloud environments including a worker, and the worker being a computer execution node configured to execute tasks using resources associated with the cloud environment. Identifying a plurality of local controllers in the plurality of cloud environments offers the technical advantage of recognizing the resource management nodes in different cloud environments. By identifying the local controllers, the multi-cloud service manager gains a clear view of which nodes are managing resources, which can lead to better decision-making when it comes to distributing tasks and resources.

The embodiment also includes selecting, by the multi-cloud service manager, a local controller from among the plurality of local controllers based on a performance metric of the local controller. Selecting a local controller from among the plurality of local controllers based on a performance metric ensures the most efficient node is chosen for the task. This provides the technical advantage of ensuring optimal resource usage and task completion speed. By selecting the local controller with the best performance metrics, the process ensures that the task at hand will be completed as efficiently as possible.

The embodiment also includes designating, by the multi-cloud service manager, the selected local controller as a super controller, the super controller being configured to manage resources associated with the plurality of cloud environments including the plurality of local controllers. Designating the selected local controller as a super controller is a strategic decision that enhances the management of resources across the cloud environments. The technical advantage here is the creation of a centralized point of control for multiple cloud environments. This helps streamline the task distribution and resource allocation process, and allows for a more efficient and coordinated approach to managing tasks across multiple cloud environments.

Overall, the embodiment provides a significant technical effect of improving the efficiency and management of multi-cloud environments. By identifying, selecting, and designating specific nodes, the multi-cloud service manager can optimize the allocation of resources, ensure tasks are distributed efficiently, and enhance overall system performance across multiple cloud environments.

An embodiment includes where the performance metric includes at least one of a workload, a processing capability, and a service accessibility. The embodiment where the performance metric includes at least one of a workload, a processing capability, and a service accessibility delivers the technical advantage of a multi-faceted evaluation of a local controller. Such an approach ensures the most optimal local controller is selected based on a broad range of critical factors, thus ensuring high efficiency and the best use of resources across the cloud environments.

An embodiment includes performing, by the multi-cloud service manager, service discovery in the plurality of cloud environments. The embodiment of performing service discovery in the plurality of cloud environments by the multi-cloud service manager grants the technical advantage of a dynamic and up-to-date understanding of the entire multi-cloud system. This real-time mapping enables accurate tracking of resource availability and load distribution, ensuring an optimized, efficient system performance.

An embodiment includes where performing service discovery includes identifying a plurality of local controllers and a plurality of workers in the plurality of cloud environments. In the embodiment where performing service discovery includes identifying a plurality of local controllers and a plurality of workers in the plurality of cloud environments, the technical advantage lies in having an up-to-date knowledge of all computational and control nodes in the system. This provides a comprehensive view of all available resources, allowing for the optimal allocation of tasks.

An embodiment includes updating, by the multi-cloud service manager responsive to the performing service discovery, a controller repository. The embodiment that involves updating a controller repository responsive to performing service discovery offers the technical advantage of maintaining an up-to-date record of system architecture and resources. This helps in the strategic and efficient allocation of resources, further optimizing multi-cloud management.

An embodiment includes transmitting, by the multi-cloud service manager to a second local controller in the plurality of local controllers, responsive to the super controller selecting the second local controller for an allocation of resources, an allocation request. Transmitting an allocation request to a second local controller in the plurality of local controllers, responsive to the super controller selecting the second local controller for an allocation of resources, provides the technical advantage of ensuring an efficient distribution of workloads. This embodiment ensures that resources are efficiently utilized and that no single local controller is overburdened, maintaining the overall health and performance of the system.

An embodiment includes transmitting, by the multi-cloud service manager to a second worker in the plurality of cloud environments, responsive to the super controller selecting the second worker for an allocation of resources, an allocation request. The embodiment involving transmitting an allocation request to a second worker in the plurality of cloud environments, responsive to the super controller selecting the second worker for an allocation of resources, offers the technical advantage of dynamic and optimal task allocation. This embodiment ensures that the workloads are balanced among the workers, promoting the efficient use of resources and improved system performance.

An embodiment includes selecting, by the multi-cloud service manager, a second local controller from among the plurality of local controllers; designating, by the multi-cloud service manager, the second selected local controller as a second super controller; de-designating, by the multi-cloud service manager, the super controller as a super controller; and updating, by the multi-cloud service manager, a controller repository. In the embodiment where the multi-cloud service manager selects a second local controller from among the plurality of local controllers, the benefit lies in the ability to dynamically reconfigure leadership roles within the system. This enables the system to adapt to changing workloads and conditions, enhancing the overall efficiency and resilience of the system.

Designating the second selected local controller as a second super controller, by the multi-cloud service manager, brings the benefit of enabling a fresh perspective and approach in managing resources and tasks across the plurality of cloud environments. The new super controller may offer different strengths or capabilities, leading to potential improvements in system performance.

The action of de-designating the super controller as a super controller, by the multi-cloud service manager, offers the benefit of flexibility. It allows for the efficient rotation of roles within the system. This also provides an opportunity for the previously designated super controller to be utilized in different ways within the system.

Finally, the action of updating a controller repository by the multi-cloud service manager brings the benefit of maintaining a current record of the system's management structure. This aids in tracking system performance, resource allocation, and the evolution of roles within the system, ensuring a well-coordinated and effective multi-cloud environment.

Overall, this embodiment provides the system with enhanced flexibility, dynamism, and adaptability, improving the resilience and performance of the multi-cloud environment.

An embodiment includes where updating the controller repository includes merging a first service discovery record associated with the de-designated super controller and a second service discovery record associated with the second super controller. In the embodiment where updating the controller repository involves merging a first service discovery record associated with the de-designated super controller and a second service discovery record associated with the second super controller, the benefit lies in preserving the accumulated knowledge and insights of both the outgoing and incoming super controllers. This facilitates a smooth transition in the management of resources and ensures continuity of service.

The act of merging the service discovery records ensures that all relevant information, including operational data, performance metrics, and resource usage patterns from both super controllers, is consolidated. This aids in providing a comprehensive picture of the system's state and performance over time, enabling better decision-making and planning.

In addition, by combining these records, the system prevents potential data loss and avoids unnecessary duplication, enhancing the efficiency and reliability of the system's data management practices.

Overall, this step of merging service discovery records contributes to a more seamless transition between super controllers, preserves vital system data, and enhances the overall efficiency and effectiveness of the multi-cloud service manager's operations.

An embodiment of the multi-cloud service manager's operation could involve the super controller performing service discovery to identify local controllers and workers across the cloud environments, updating a controller repository, and then sends allocation requests to selected local controllers and workers. This embodiment can have the technical advantage of creating a more dynamic and responsive cloud environment. In particular, the service discovery feature can enable the super controller to have a real-time understanding of the available resources and capacities across the cloud environments, which can then inform better decision-making regarding resource allocation.

A specific use case of this or another embodiment might involve a large organization with operations across different geographical locations. Each location might have its own local cloud environment, but resources need to be shared and allocated across these locations efficiently. The organization could implement the multi-cloud service manager to manage these resources. The manager can identify the local controllers in each cloud environment, designate a super controller based on performance metrics, and then manage resources effectively across all environments. If there's a sudden surge in demand for resources in one location, the super controller can quickly reallocate resources to meet this demand, enhancing the organization's operational efficiency and responsiveness.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 9 depicts a block diagram of an example process for managing a multi-tier multi-cloud architecture in accordance with an illustrative embodiment.

DETAILED DESCRIPTION

Figure 1:
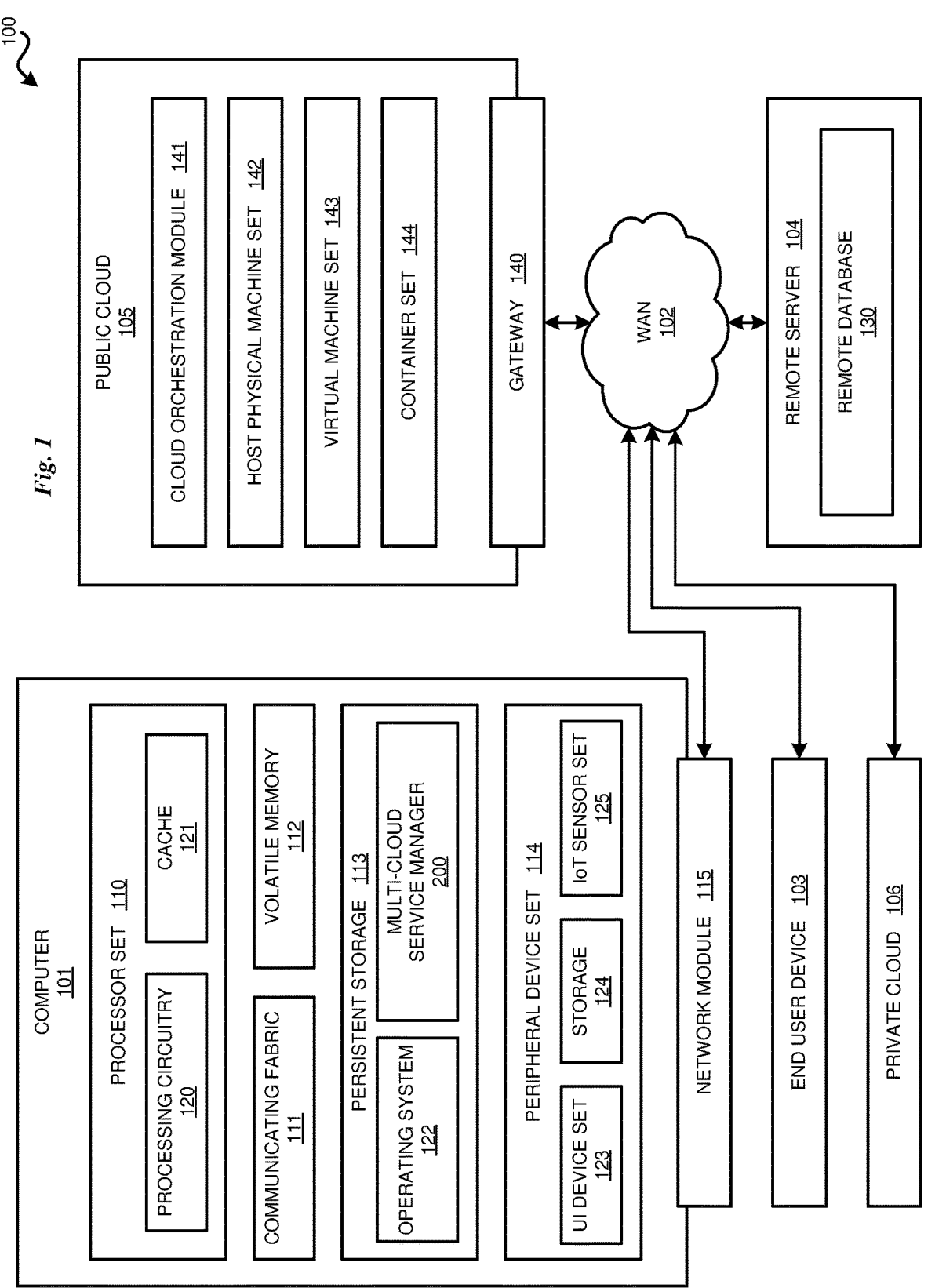
FIG. 1 depicts a block diagram of a computing environment in accordance with an illustrative embodiment.

Hybrid cloud technology promises efficiency through seamless integration of private and public cloud resources, resource optimization, improved scalability, and enhanced disaster recovery capabilities. Despite the promise of efficiency, the management of multi-cloud networks quickly becomes challenging due to a lack of visibility into workloads across various clouds, which creates difficulties when compliance and regulatory constraints are integral to business operations.

Consequently, there is a pressing demand for comprehensive and robust multi-cloud network infrastructure. This extends from workload management to access, aiming to provide agility, flexibility, elastic scaling, operational efficiency, and security. These multi-cloud networking solutions must ensure a consistent network policy across various cloud providers through software. Elements such as network configurations, security policies, troubleshooting, and even analytics and reporting should be accessible, irrespective of where the workload is running.

Organizations frequently require the flexibility to transfer workloads as per their unique operational needs. However, managing such workloads across disparate cloud environments with various interfaces and tools can be a challenging task. As a result, instead of fostering innovation and streamlining connections between these diverse environments, IT teams are often preoccupied with the intricacies of routine IT infrastructure operations.

Moreover, given the need for increased flexibility, organizations are progressively adopting the local-cloud-as-a-service (LCaaS) platform. LCaaS is a service cloud option where a dedicated or private provider enables an organization to consume infrastructure as a resource rather than as individual components or products. This approach can significantly simplify the management of digital environments, thereby enhancing the alignment of IT investments with business operations.

An LCaaS platform delivers the benefits of a public cloud within a dedicated, on-premises environment. It serves as a foundation for the hybrid cloud model, providing a consistent and effective strategy for moving and managing workloads and applications.

An LCaaS platform may introduce efficiencies and productivity gains for organizations. By mitigating the complexities associated with conventional methods, the platform creates a more agile and responsive IT infrastructure. This, in turn, empowers organizations to focus more on innovation and less on day-to-day operational complexities, paving the way for significant business growth and transformation.

Nevertheless, the technological landscape underscores a pressing need for a method that can adeptly manage multiple multicloud networks. This requirement is pertinent across various platforms, be it an LCaaS or any other cloud service provider. The desired method must exhibit robust efficiency to cater effectively to the ever-evolving demands of contemporary organizations.

The present disclosure addresses the deficiencies described above by providing a process (as well as a system, method, machine-readable medium, etc.) that harnesses the potential of a three-tier architecture in a hybrid multicloud infrastructure. This novel invention encompasses the maintenance of a controller repository comprising information related to local controllers and workers, thereby facilitating seamless integration and smooth operation of services across the hybrid multicloud environment.

The illustrative embodiments provide for a multi-tiered hybrid multi-cloud service management architecture. "Multi-tiered." as used herein, may refer to an architecture that is organized into several layers or tiers, each dedicated to manage particular types of tasks within a structured system design. "Hybrid," as used herein, may refer to a computational environment that integrates multiple types of cloud services, such as public and private clouds, into a single interconnected network. "Multi-cloud," as used herein, may refer to a strategy that involves the utilization of multiple cloud computing and storage services within a singular network architecture. "Service," as used herein, may refer to a function or capability that is provided over a network, such as by a cloud service provider. Such a service could encompass a range of services such as software as a service (SaaS), platform as a service (PaaS), and infrastructure as a service (IaaS), among others. "Management," as used herein, may refer to a collection of processes and tools used to monitor, control, and optimize tasks within a network. Management tasks can involve a variety of operations, including but not limited to, provisioning and de-provisioning of resources, performance monitoring, cost tracking, and security measures, among others. "Architecture," as used herein, may refer to the comprehensive design and structure of a system, encompassing the arrangement of its components, their interactions, communication methodologies, and the principles and guidelines directing its design.

For example, a multi-tier architecture may be designed to maintain a controller registry of local controllers and workers. The adoption of such an architecture may streamline the integration of services within a hybrid multicloud environment. This may be useful in modern digital environments, which often require a versatile and robust architecture for efficient management and operations. For instance, a microservice infrastructure instance, such as Kubernetes or a pod, may be initiated in any of the clouds participating in the multicloud hybrid infrastructure. In such cases, there may be an absence of orchestration requirements in the current technological landscape, which can hinder the management and communication interface between the parties involved. The user of a multi-tiered architecture may allow the infrastructure to be effectively integrated and managed, tailoring to the specifications of the application and the target requirements.

Illustrative embodiments include a multi-tier architecture implemented within a hybrid multicloud environment. In some embodiments, a multi-tier architecture may comprise one or more super controllers, one or more local controllers, and one or more workers. For example, in some embodiments, the local controllers, which may maintain their own control plane, may conform to a three-tier structure comprising a top tier including the super controller, a medium tier including the local controllers, and a bottom tier including the workers. This structured hierarchy may bring about enhanced control and better orchestration in the multicloud environment, improving both efficiency and consistency across the diverse cloud platforms involved.

In some embodiments a local controller may be a computer control node configured to manage resources associated a cloud environment in a plurality of cloud environments including a worker. A "computer control node," as used herein, may refer to a computer processing system or device in a cloud environment with administrative responsibilities. It may oversee and govern operations, ensuring optimal performance and stability. This process may involve the monitoring of available resources, coordinating tasks, load balancing, and managing the activity of workers within a cloud environment.

In some embodiments, a worker may be a computer execution node configured to execute tasks using resources associated with the cloud environment. A "computer execution node," as used herein, may refer to a component within the cloud environment that directly handles the execution of tasks. It may be assigned computational jobs by a control node, such as a local controller or a super controller, and it may use its processing capabilities to execute tasks. Workers may conduct the practical computational operations that fulfill the objectives of the cloud-based applications and services.

There may be a situation where a source has one controller monitoring all the workers in a domain. In one non-limiting example, there could be three controllers since three clouds are participating. In a situation where there is one controller and two workers communicating with the controller, there may be extant problems in that direct information exchange may only be possible between two of these (e.g., the controller and one of the workers), preventing the workers from being shared across the cloud infrastructure. This limitation in scalability may arise for instance in a two-tier architecture. A three-tier architecture, on the other hand, may enable a single global controller, hereinafter referred to as a "super controller," to control local controller and workers. In this three-tier architecture, the workers may be distributed across this architecture, offering an improved and scalable solution to manage multicloud hybrid infrastructure.

In some embodiments, the super controller may be configured to manage resources associated a plurality of cloud environments. This role may involve the super controller orchestrating tasks, distributing resources, or otherwise managing operations across multiple cloud platforms, such as by delegating tasks to local controllers or workers in a cloud environment. This process may ensure optimal utilization of resources, reduce redundancy, and enable efficient load balancing. The super controller's wide reach and control capabilities may provide a cohesive and efficient approach to managing diverse cloud environments, which may be beneficial in multi-cloud architectures.

In some embodiments, the cloud environments in the multicloud environment may comprise different computer hardware or software. For instance, one cloud may run an Intel Skylake processor that may vastly outperform another cloud running an older x86 machine. As another example, different cloud environments may maintain their own Kubernetes and controller layers. Each of these cloud environments may have its own Kubernetes or extended VMs orchestrating across the pods. For instance, each cloud environment may possess its own control planes. In another instance, each individual cloud may maintain its own unique Kubernetes.

Illustrative embodiments include detecting an inter-cloud service negotiation between a plurality of cloud environments. An "inter-cloud service negotiation" (also referred to as a "satellite handshake"), as used herein, may refer to the process of establishing communication and cooperation protocols between different cloud environments. In some embodiments, the inter-cloud service negotiation may indicate an interaction between the plurality of cloud environments. For example, when two distinct cloud systems initiate a process to share resources or information, they may perform an inter-cloud service negotiation to establish communication standards and security protocols.

Illustrative embodiments include identifying a plurality of local controllers in the plurality of cloud environments. Identifying a plurality of local controllers may involve recognizing and tracking the local controller within different cloud environments in a hybrid or multi-cloud architecture. For example, a super controller may identify local controllers in IBM Cloud, Google Cloud, and AWS, and keep a record of them for orchestration purposes. In some embodiments, local controllers may be tracked using a controller repository for storing information related to the components in the plurality of cloud environments.

In some embodiments, a local controller in the plurality of local controllers may manage one or more workers. Managing a worker may involve controlling worker nodes in a cloud environment, which may be responsible for running tasks or services. For example, a controller node in a Kubernetes environment may manage worker nodes by assigning tasks and monitoring their execution. The local controllers may be the controllers within the defined clouds and maintain the essential functions of discovering and managing the services within their respective planes. Both local controllers and the super controller may share a pre-established method to discover and manage services in the plane. This process may facilitate seamless interaction and management within the hybrid multicloud system, thereby contributing to the overall efficiency and resilience of the infrastructure. It should be noted, however, that a controller may function both as a controller and a worker.

In some embodiments, the workers may be distributed across inter-cloud environments. In such an environment, workers may originate from any of the participating clouds. As a non-limiting example, a worker may come from the same cloud where the super controller resides, or it may come from a different cloud. In such cases, a single control plane may span across various clouds, yet the local controllers may remain accessible to their corresponding workers. This configuration may ensure a fluid exchange of information and maintain the control and management functions of the local controllers within their respective clouds. As another non-limiting example, the workers may belong to a cloud different from that of the local controller, necessitating communication via inter-cloud Transport Layer Security (TLS). This configuration may ensure secure data transmission between different clouds, maintaining the integrity and confidentiality of the information being exchanged.

Illustrative embodiments include selecting a local controller from among the plurality of local controllers. Selecting a local controller may involve choosing a specific local controller from multiple local controllers for a particular task or role, such as for designation as a super controller. This could be based on one or more performance factors such as resource availability, geographic location, load balancing considerations, or any other relevant factor.

For example, a performance factor may include computer capacity, which refers to the processing power of the local controller, including factors such as the number of cores and the processing speed. Memory availability, which pertains to the available RAM for task execution, can also be an influential performance factor as it may impact the performance of the local controller's cloud environment. Additionally, storage capacity, including the total available storage space and the type of storage (such as SSD or HDD), and network bandwidth, denoting the speed and latency of the network connection of the local controller may be considered.

Other performance factors may extend to the task queue length, reflecting the number of tasks currently assigned to the local controller, and power efficiency, which considers the energy consumption of the local controller during operation. Historical performance, based on past records of the local controller's efficiency and reliability, alongside uptime/downtime records, which gauge the reliability and availability of the local controller, may also be considered.

Moreover, the level of security measures and protocols present in the local controller, compliance with relevant regulations, particularly regarding data handling and privacy, and integration capabilities, referring to the local controller's ability to integrate with other systems or software, may be considered in the selection process.

Furthermore, cost efficiency, the operational cost of the local controller relative to its performance, scalability, the capacity of the local controller to handle increasing workloads, redundancy, which assesses the local controller's resilience and backup capabilities in case of failures, and software compatibility, the compatibility of the local controller with specific software or applications required for task execution, may also be considered.

For example, in some embodiments, a local controller may be selected based on workload. A "workload," as used herein, may refer to the total computing tasks or processes that a system, or a part of the system, is tasked with. For instance, the tasks running on a worker node in a cloud environment constitute its workload. As another example, in some embodiments, a local controller may be selected based on processing capability. "Processing capability," as used herein, may refer to the computational power or resources of a system, or part of a system. For instance, the processing capability of a worker node might be determined by factors like its CPU power, memory capacity, and network bandwidth. As a further example, in some embodiments, a local controller may be selected based on service accessibility. "Service accessibility," as used herein, this may refer to the ability to access and use a specific service or resource within a system. For instance, service accessibility in a cloud environment might be determined by factors like network connectivity, authorization permissions, and the operational status of the service.

Illustrative embodiments include designating a local controller as a super controller. Designating a local controller as a super controller may include assigning the highest level of control and orchestration responsibility to a local controller, making it a "super controller." For example, in a multi-cloud architecture, a local controller might be designated as a super controller to manage and coordinate other local controllers in the system. The super controller's elevated position in the hierarchy may allow it to oversee and regulate the interactions and exchanges among the various components of the hybrid multicloud system, thereby ensuring smooth and efficient operation.

In some embodiments, the super controller may manage one or more other local controllers in the plurality of local controllers. Managing a local controller may include controlling, coordinating, or orchestrating the operation of multiple local controllers within a system. For example, a super controller may manage other local controllers by overseeing their operation, coordinating inter-cloud communication, or balancing workloads among them.

In some embodiments, the super controller may be initialized dynamically or statically. For instance, in some embodiments, the super controller may be initiated from any preferred cloud location participating in the satellite communication within the multicloud system. The location of the super controller may be chosen dynamically depending on the current workload provisioning on each participating cloud. Additionally or alternatively, the super controller may be determined by a static configuration triggered at the start of a satellite handshake.

In some embodiments, the super controller may be designated upon detecting an inter-cloud service negotiation between a plurality of cloud environments. For example, when the satellite handshaking commences, a local controller may assume control of the multicloud environment thereby elevating itself to super controller. The super controller may be initialized from any preferred cloud location among the available multi-clouds participating in the satellite communication. In one non-limiting example, the super controller's location may be selected dynamically based on the current workload provisioning on each participating cloud. Additionally or alternative, a static configuration may be triggered during the initiation of the satellite handshake.

Illustrative embodiments include managing, by the super controller, the plurality of local controllers in the plurality of cloud environments. For example, in some embodiments, there may be local controllers under the super controller, where the local controllers within the defined clouds may have pre-established mechanisms to discover and manage workers within their control plane. For instance, workers may be distributed across multiple clouds. Workers may originate from any of the participating clouds, including the same cloud where the super controller resides or from a different cloud. In such cases, one super controller control plane may span across the clouds while the local controllers continue to manage their local workers. Additionally or alternatively, workers may exist in another cloud, necessitating communication through inter-cloud TLS communication for secure data transfer and interaction.

Illustrative embodiments include performing service discovery in the plurality of cloud environments. "Service discovery," as used herein, may refer to the process by which services or resources within a distributed or cloud-based system are located or identified. For example, in a Kubernetes environment, service discovery might be performed to identify the IP addresses and ports of pods running a specific service. In some embodiments, performing service discovery may be used to identify a plurality of local controllers and a plurality of workers in the plurality of cloud environments. Performing service discovery to identify local controllers and workers may involve using service discovery mechanisms to locate and identify multiple control nodes (local controllers) and computational nodes (workers) within a system. For example, a super controller might use service discovery to identify all local controllers and workers in a multi-cloud environment.

In some embodiments, service discovery may occur when services are initiated. In this case, the local cloud may first provide the controllers and then configure the workers attached to the local controller. Another scenario could be that workers are already present and attached to the local controller, leading to discovery by the super controller. The super controller may then create a controller repository which is orchestrated across all participating clouds, facilitating better inter-cloud communication and management.

Illustrative embodiments include updating a controller repository. A "controller repository," as used herein, may refer to a database or storage system that contains information about the multi-cloud environment. For example, a controller repository might contain details about the location, status, and capabilities of each local controller and/or worker in a multi-cloud environment. Updating the controller repository may involve modifying the data stored in the controller repository to reflect the current state of the system. For example, if a new local controller is added to a multi-cloud environment or the status of a local controller changes, the super controller might update the controller repository to include this new information. This update ensures that the controller repository always provides an accurate snapshot of the system's current configuration and state. In some embodiments, updating the controller repository may be based on the results of service discovery. For example, if service discovery identifies a new local controller or a change in the status of an existing local controller, the controller repository might be updated to reflect this change.

In some embodiments, discovery and operational control plane instructions may proceed as usual when the super controller is initialized. In these situations, the local cloud may first provision the controllers. Following this provisioning, the local controllers may configure the workers attached to them, facilitating the effective integration of resources and promoting overall network efficiency. For example, in some embodiments, workers may already be present and attached to a local controller. In such scenarios, the workers may undergo discovery by the super controller, ensuring the system is aware of all operational nodes and their current states. Upon discovery, the super controller may create a controller discovery record. The controller discovery record may facilitate efficient resource utilization and seamless integration of services across disparate cloud platforms.

Illustrative embodiments include selecting, responsive to receiving a service request for an allocation of resources, a local controller in the plurality of local controllers. A "a service request," as used herein, may refer to a request sent by a service or application for specific resources to be allocated to it. For example, an application might send a service request asking for the allocation of more CPU power or memory to handle increased demand. For instance, a service request may be the result of a user interacting with a computing device linked to a cloud environment and requesting resources to perform operations associated with a user request.

Illustrative embodiments include transmitting to the selected local controller an allocation request for the allocation of resources. This process may involve the act of sending an allocation request from a super controller to a selected local controller. For example, if a super controller determines that a certain service requires more resources, it might send an allocation request to a local controller instructing it to allocate those resources. In some embodiments, the super controller may query the satellite backbone to identify which local controller corresponds to a specific Cloud ID. This query may ensure efficient routing of tasks and requests within the network, reducing communication overhead and improving overall network efficiency.

In some embodiments, the super controller may intelligently route requests to a particular local controller. For example, in certain embodiments, the super controller may use artificial intelligence to learn from its interactions with other components of the network. For instance, it may learn from its requests to local controller, such as by becoming aware of which microservices are being managed by a particular controller, and can reach out to that particular local controller with a particular request. With the inclusion of the super controller tier in the architecture, which orchestrates across clouds, services can be extended directly to another cloud outside the region of the local controllers.

Illustrative embodiments include selecting, responsive to receiving a service request for an allocation of resources, a worker in the plurality of workers. This process may involve the super controller choosing a specific worker to allocate resources in response to a service request. For example, the super controller might select a worker based on factors like its current workload, location, or available resources.

Illustrative embodiments include transmitting to the selected worker an allocation request for the allocation of resources. This process may involve the act of the super controller sending an allocation request to a selected worker through any suitable channel. For example, this step may occur after the super controller has decided that the worker is the most suitable choice to handle the requested resource allocation.

In some embodiments, the workers may converge at the local controller, relegating the super controller to a passive role. In such a scenario, discovery and management operations may be executed by the local controllers, leading to a simplified role hierarchy. This approach may decentralize control, spread the management responsibilities across the local controllers, and enhance the resilience and redundancy of the system.

Illustrative embodiments include performing, by a worker, an action associated with an instruction. Performing an action associated with an instruction may involve the execution of a specific task or operation by a worker in response to a command received. For example, if a worker receives an instruction from a local controller or super controller to deploy a container, the worker may execute the necessary operations to fulfill that instruction. In some embodiments, the worker may be a local controller.

Illustrative embodiments include selecting a second local controller from among the plurality of local controllers. Selecting a second local controller may involve choosing another local controller from a group of local controllers within a multi-cloud environment. For example, if a more suitable local controller is identified in the plurality of cloud environments than the current super controller, that more suitable local controller may be selected. As another example, if the current super controller fails or needs to be replaced, a second local controller could be chosen to take over its responsibilities.

Illustrative embodiments include designating the second selected local controller as a second super controller. Designating the second selected local controller as a second super controller may involve assigning the role of super controller to a second selected local controller. For example, in the event of a more suitable super controller is located, or in the event of a super controller's failure, a second selected local controller could be promoted to the position of super controller.

Illustrative embodiments include de-designating the super controller as a super controller. De-designating the super controller as a super controller may involve removing the super controller role from the current super controller. For example, this could be part of the process of replacing the current super controller with a new one.

Illustrative embodiments include updating a controller repository, responsive to identifying a second super controller in the plurality of cloud environments. Updating a controller repository may involve modifying the controller repository to include information about a newly identified second super controller. For example, if a second super controller is recognized within a multi-cloud environment, the controller repository could be updated to include information about this new super controller and/or information discovered (e.g., as a result of performing service discovery) by the original or new super controller, enhancing the overall system's understanding and management.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The process software including the multi-tier hybrid multi-cloud orchestration software is integrated into a client, server and network environment, by providing for the process software to coexist with applications, operating systems and network operating systems software and then installing the process software on the clients and servers in the environment where the process software will function.

The integration process identifies any software on the clients and servers, including the network operating system where the process software will be deployed, that are required by the process software or that work in conjunction with the process software. This includes software in the network operating system that enhances a basic operating system by adding networking features. The software applications and version numbers will be identified and compared to the list of software applications and version numbers that have been tested to work with the process software. Those software applications that are missing or that do not match the correct version will be updated with those having the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems, including the network operating systems, will be identified and compared to the list of operating systems, version numbers and network software that have been tested to work with the process software. Those operating systems, version numbers and network software that do not match the list of tested operating systems and version numbers will be updated on the clients and servers in order to reach the required level.

After ensuring that the software, where the process software is to be deployed, is at the correct version level that has been tested to work with the process software, the integration is completed by installing the process software on the clients and servers.

With reference to FIG. 1, this figure depicts a block diagram of a computing environment 100. Computing environment 100 contains an example of an environment for the execution of at least some of the computer code involved in performing the inventive methods, such as multi-cloud service manager 200 for establishing a hierarchical architecture and orchestrating workloads across multiple cloud environments. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
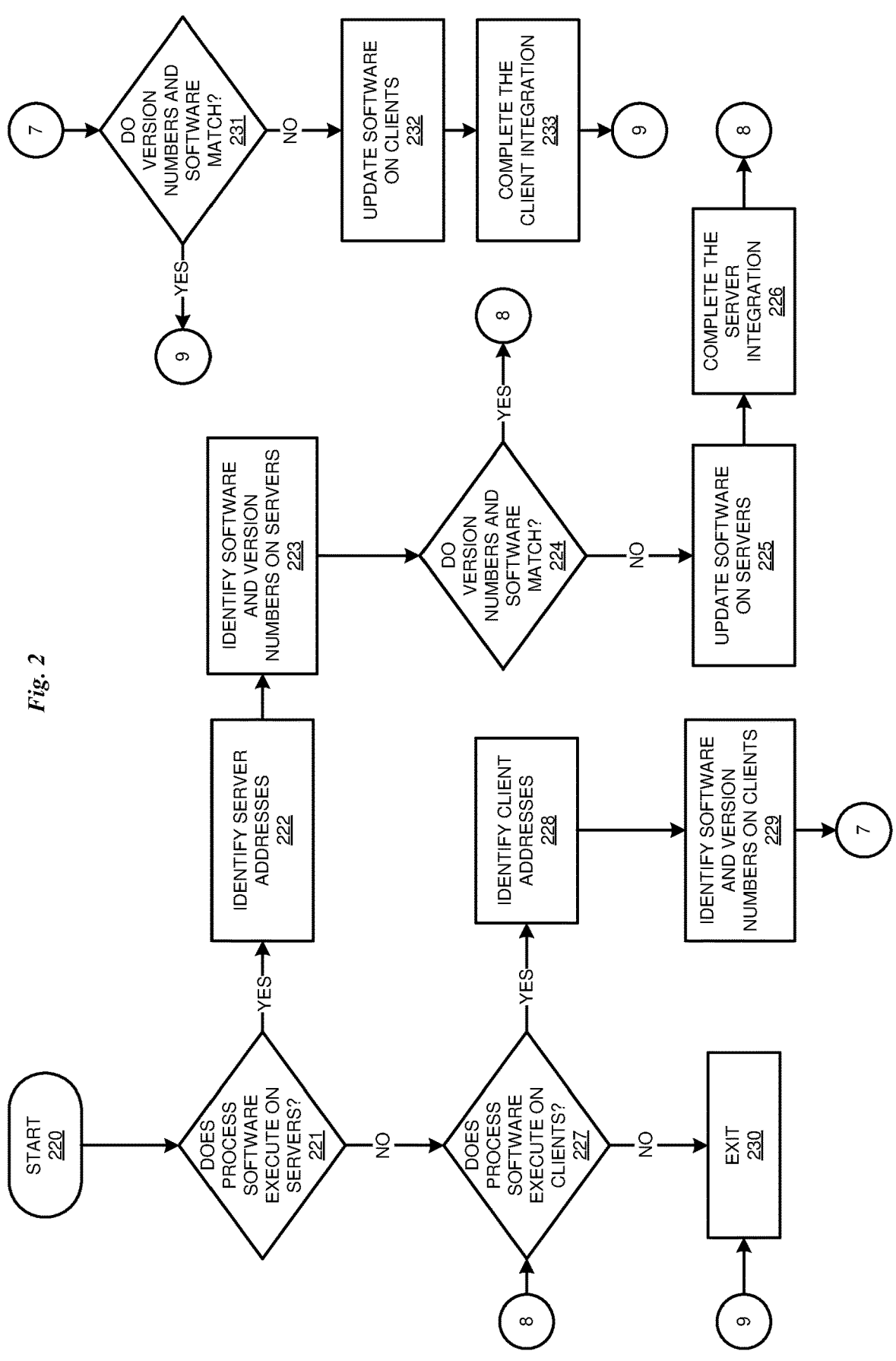
FIG. 2 depicts a block diagram of an example software integration process in accordance with an illustrative embodiments.

With reference to FIG. 2, this figure depicts a block diagram of an example software integration process 200, which various illustrative embodiments may implement. Step 220 begins the integration of the process software. An initial step is to determine if there are any process software programs that will execute on a server or servers (221). If this is not the case, then integration proceeds to 227. If this is the case, then the server addresses are identified (222). The servers are checked to see if they contain software that includes the operating system (OS), applications, and network operating systems (NOS), together with their version numbers that have been tested with the process software (223). The servers are also checked to determine if there is any missing software that is required by the process software (223).

A determination is made if the version numbers match the version numbers of OS, applications, and NOS that have been tested with the process software (224). If all of the versions match and there is no missing required software, the integration continues (227).

If one or more of the version numbers do not match, then the unmatched versions are updated on the server or servers with the correct versions (225). Additionally, if there is missing required software, then it is updated on the server or servers (225). The server integration is completed by installing the process software (226).

Step 227 (which follows 221, 224 or 226) determines if there are any programs of the process software that will execute on the clients. If no process software programs execute on the clients, the integration proceeds to 230 and exits. If this not the case, then the client addresses are identified (228).

The clients are checked to see if they contain software that includes the operating system (OS), applications, and network operating systems (NOS), together with their version numbers that have been tested with the process software (229). The clients are also checked to determine if there is any missing software that is required by the process software (229).

A determination is made if the version numbers match the version numbers of OS, applications, and NOS that have been tested with the process software (231). If all of the versions match and there is no missing required software, then the integration proceeds to 230 and exits.

If one or more of the version numbers do not match, then the unmatched versions are updated on the clients with the correct versions 232. In addition, if there is missing required software, then it is updated on the clients 232. The client integration is completed by installing the process software on the clients 233. The integration proceeds to 230 and exits.

Figure 3:
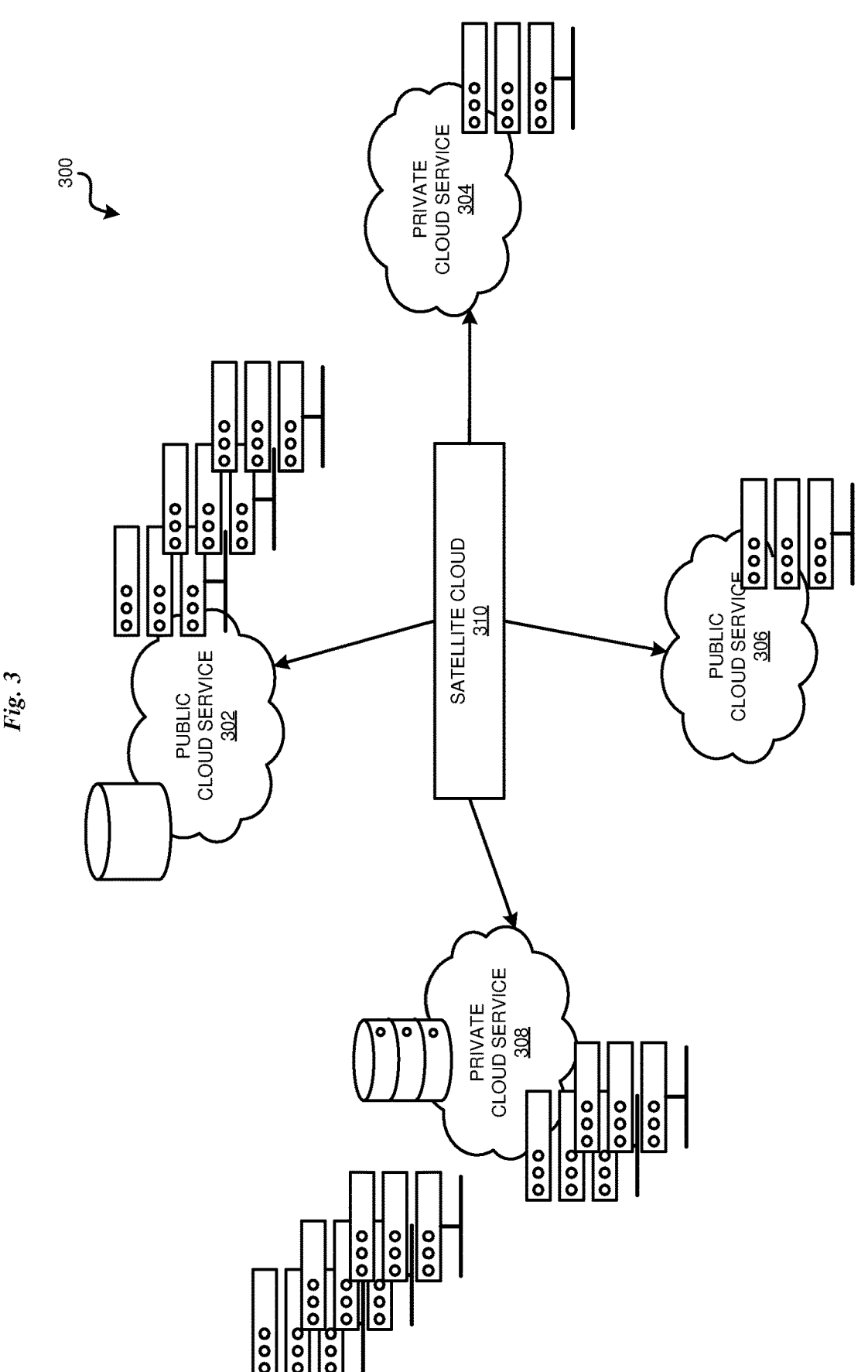
FIG. 3 depicts a block diagram of an example hybrid multi-cloud environment in accordance with an illustrative embodiment.

With reference to FIG. 3, this figure depicts an example hybrid multi-cloud environment 300. As shown in FIG. 3, a hybrid multi-cloud environment may include one or more public cloud services, such as public cloud services 302 and 306. A "public cloud service," as used herein, may refer to a type of computing service that provides scalable computing resources over the internet, available to the general public. The service provider may own and operate the resources, including servers and networking equipment, and customers may access these services and manage their accounts via a web browser. Examples of public cloud providers may include Amazon Web Services (AWS), Google Cloud Platform (GCP), Microsoft Azure, and IBM Cloud.

Additionally or alternatively, as shown in FIG. 3, a hybrid multi-cloud environment may include one or more private cloud services, such as private cloud services 304 and 308. A "private cloud service," as used herein, may refer to a computing service model that delivers similar functionality as a public cloud but through a proprietary architecture dedicated to a single organization. In a private cloud, the services and infrastructure may be maintained on a private network, offering more control and privacy. This model may be utilized by businesses with large computational and storage requirements, or strict data, control, and security needs. Examples of private cloud implementation may be a company setting up its own data center with cloud infrastructure, or using services like IBM Cloud Private, AWS Outposts, Azure Stack, or Google Anthos. It is to be understood that a hybrid multi-cloud environment may comprise a combination of public and private cloud services, or it may comprise only public cloud services or only private cloud services.

As further shown in FIG. 3, two cloud environments may be connected by an intermediary cloud, such as via satellite cloud 310. The satellite cloud may serve as a facilitator for inter-cloud communication and cooperation, enabling resources and data to be shared, accessed, and managed across different cloud environments. The satellite cloud may thus facilitate a hybrid cloud or a multi-cloud setup, providing a way to leverage the advantages of multiple cloud services, whether public or private. It could comprise a combination of on-premises, private cloud, and third-party, public cloud services with orchestration among these platforms. In some embodiments, satellite cloud 310 may implement multi-cloud service manager 200 of FIG. 1 to perform the functions recited herein.

Figure 4:
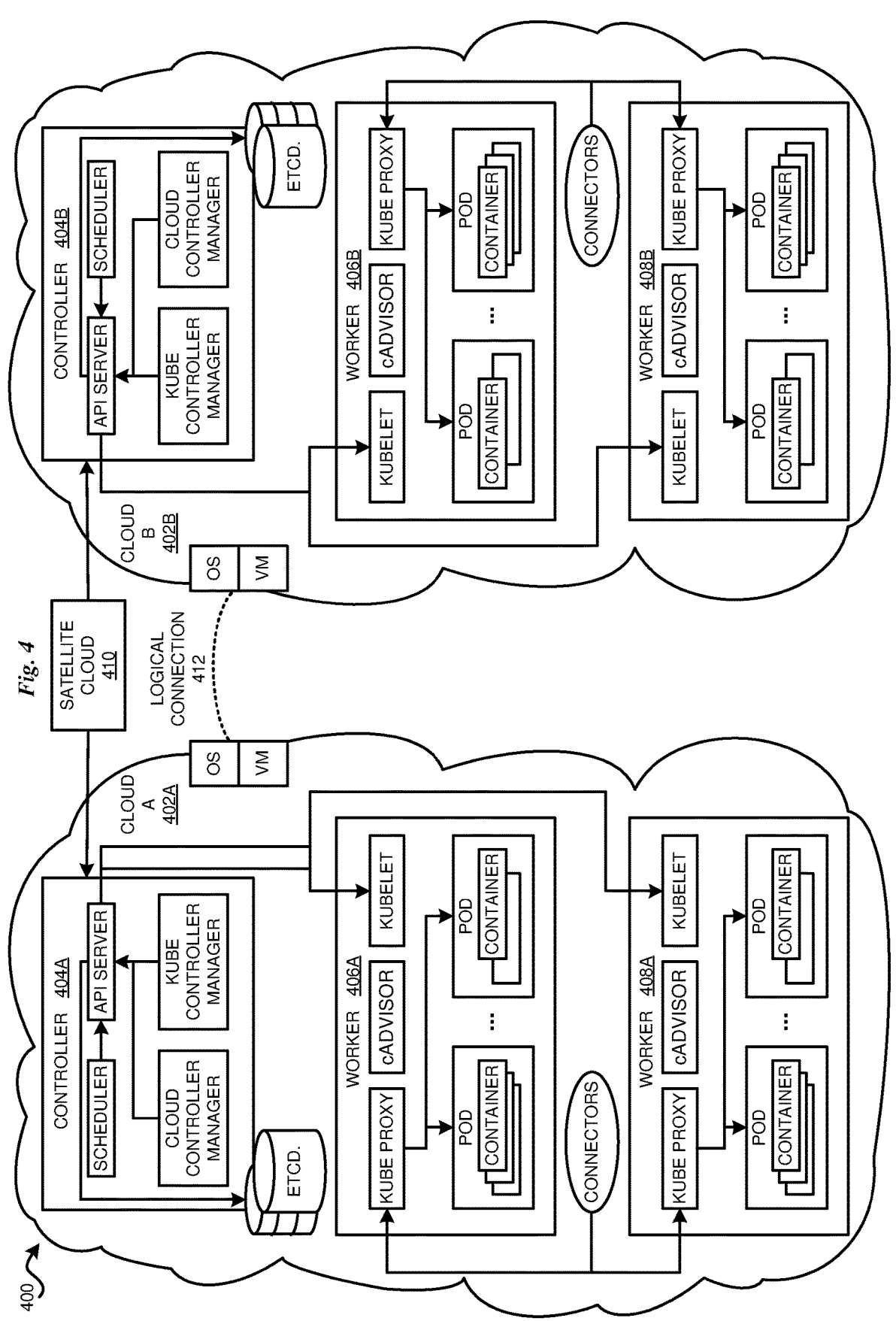
FIG. 4 depicts a block diagram of an example diagram of a super controller in accordance with an illustrative embodiment.

With reference to FIG. 4, this figure depicts an example multi-cloud environment in accordance with an illustrative embodiment 400. As shown in FIG. 4, a multi-cloud environment may include multiple cloud environments, such as cloud A 402a and cloud B 402b. As further shown, a cloud environment may incorporate various components that contribute to its functionality and versatility. This may encompass one or more operating systems (depicted as "OS"), each providing a crucial framework for the interaction of software and hardware within the cloud system. Furthermore, the cloud environment may house multiple virtual machines (depicted as "VM"), which serve as emulated computing systems. These VMs may permit users to run applications as if they were on separate, dedicated hardware, facilitating greater flexibility and efficiency. Another component may be data storage system (depicted as "ETCD"), which may securely store data in a distributed key-value store. It is to be understood that a cloud environment may include some, all, or none of these components, along with any other desired elements.

As further shown in FIG. 4, a cloud computing may comprise one or more controller nodes, or "local controllers," such as controllers 404a and 404b. The controller nodes may serve as the controlling elements in a particular cloud, responsible for the management of the overall state of the cloud environment. They may handle, for example, scheduling, resource allocation, and the coordination of system tasks, ensuring the efficient operation and stability of the cloud infrastructure.

Each controller node may include one or more components. For instance, a controller node may incorporate a scheduler. The scheduler may be tasked with the responsibility of distributing work or tasks across the various worker nodes. It may factor in the resource availability, workload demands, and any user-specified constraints to ensure optimal resource utilization and to maintain the balance of workloads across the cloud.

Moreover, a controller node may also include an API server. The API server may act as a liaison, providing a communication hub for the components within the cloud environment. It may, for example, expose the Kubernetes API, process and validate REST operations, update the corresponding objects in the ETCD, among other tasks.

In addition, a controller node may include a cloud controller manager. The cloud controller manager may interface with the underlying cloud provider, managing the interactions and ensuring interoperability, handling functionalities such as node lifecycle operations, managing volumes and IP addresses, among others.

Furthermore, a controller node may include a Kubernetes controller manager. The Kubernetes controller manager may encapsulate core control loops shipped with Kubernetes that regulate the state of the system. These control loops may, for example, continually compare the desired state of the cloud system, as defined in the controller node, with the actual state and make the necessary adjustments to reconcile the two. A controller node may include different or additional components, as would be appreciated by those having ordinary skill in the art upon reviewing the present disclosure.

As further shown in FIG. 4, a cloud computing may comprise one or more worker nodes, such as workers 406a, 406b, 408a, and 408d. The worker nodes may be tasked with running the workloads and reporting back to the controller nodes.

Each worker node may include one or more components. For example, a worker node may include a Kubernetes proxy. The Kubernetes proxy may be a network proxy that runs on each node, maintaining network rules and performing connection forwarding. It may also allow for the Kubernetes services to communicate with each other and other network sessions. It may thus ensure the seamless networking among various components within and across the nodes.

A worker node may also include a container advisor, or "cAdvisor." A cAdvisor may be an open-source agent integrated into the Kubelet binary that monitors resource usage and performance characteristics of running containers. It may, for example, collect, process, and export vital information about running containers, providing precise, real-time data on the state of the system. This information may help in understanding the performance characteristics of the applications and tuning them for optimal performance.

Moreover, each worker node may include a Kubelet. A Kubelet may be an agent that runs on a node in the cluster and ensures that containers are running in a pod. It may, for example, take a set of PodSpecs, which are descriptions of pods, and ensure that the containers described in those PodSpecs are running and healthy. The Kubelet may be responsible for the communication between the controller and the worker it runs on.

Furthermore, a worker node may host pod, with one or more containers within them. A pod may be the smallest and simplest unit in the Kubernetes object model that may be created or deploy. A pod may represent a single instance of a running process in a cluster and can contain one or more containers. The containers within a pod may share an IP Address, port space, and have a shared context. A worker node may include different or additional components, as would be appreciated by those having ordinary skill in the art upon reviewing the present disclosure.

As further shown in FIG. 4, two cloud environments may be connected by an intermediary cloud, such as via satellite cloud 410. The satellite cloud may serve as a facilitator for inter-cloud communication and cooperation, enabling resources and data to be shared, accessed, and managed across different cloud environments, as previously noted. In some embodiments, satellite cloud 410 may implement multi-cloud service manager 200 of FIG. 1 to perform the functions recited herein.

Additionally or alternatively, as shown in FIG. 4, two cloud systems may be connected logically, such as through logical connection 4512. The establishment of a logical connection, such as logical connection 412, might entail creating connections among various components of the cloud environments. This could include components like operating systems or virtual machines in these environments. For instance, an operating system may enable the management of hardware and software resources on servers, while also providing various services for software applications to run. When logically connected across different cloud systems, it may facilitate the interoperation of applications and processes across the environments. Similarly, virtual machines may also be involved in logical connections. A virtual machine may emulate software of a computer system. It may run on a host machine managed by a hypervisor and can execute applications like a separate computer in separate cloud environments. Logically linking virtual machines in different cloud systems may allow for smoother migration of workloads, better resource management, and enhanced scalability. In some embodiments, logical connection 412 may implement multi-cloud service manager 200 of FIG. 1 to perform the functions recited herein.

Figure 5:
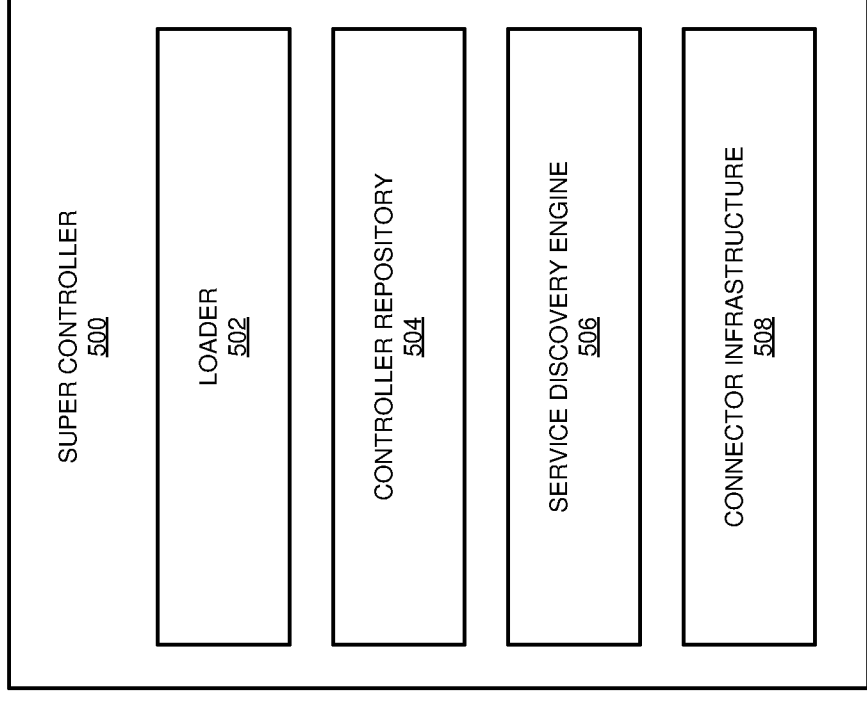
FIG. 5 depicts a block diagram of an example diagram of a super controller in accordance with an illustrative embodiment.

With reference to FIG. 5, this figure depicts an example diagram of a super controller in accordance with an illustrative embodiment 500. A super controller may be responsible for overseeing and managing a set of local controllers and/or workers across various cloud environments. In essence, a super controller can be thought of as a "controller of controllers," controlling and coordinating the operations of the local controllers and/or workers under its purview.

For example, in a hybrid multi-cloud context, the super controller can determine which local controller should handle a specific workload, based on considerations like processing capability, service accessibility, and current load. It might also engage in inter-cloud service negotiations, manage resource allocation, and perform service discovery across the cloud environments. By maintaining an updated controller repository, the super controller may enable effective resource utilization and smooth orchestration across the various cloud systems.

As shown, super controller 500 may comprise multiple components. For example, in some embodiments, one component of the super controller may be a loader 502. This component may serve as a configuration management tool, ensuring that the settings for the super controller and associated systems are correctly loaded and applied. It may handle the initial loading of the super controller and manage any subsequent configuration changes. It may also support the dynamic nature of cloud computing, allowing configurations to be easily adapted as the system requirements change, enabling flexibility and efficiency.

Another component within the super controller 500 may be a controller repository 504. The controller repository may form a central store for data and information relevant to the operation of the super controller. It may maintain details regarding system states, configuration settings, worker status, and other data, thereby serving as an information hub. The controller repository may contribute to the efficient management and coordination of the cloud environment, facilitating informed decision-making and timely response to changing circumstances.

Moreover, the super controller 500 may include a service discovery engine 506. The service discovery engine may facilitate the identification and location of services across the multi-tier, hybrid, multi-cloud architecture. With the complexity of modern cloud environments, services may be distributed across numerous nodes and tiers, thus a mechanism for discovering and cataloguing these services may be necessary. The multilevel service discovery engine may fulfil this requirement, constantly scanning the environment to detect and register available services.

Furthermore, the super controller 500 may comprise a connector infrastructure 508. The connector infrastructure may provide the necessary interfaces and protocols for connecting and communicating with various entities within the cloud environment, such as local controllers, workers, and other super controllers. It may serve as the communication backbone of the super controller, enabling data exchange and command propagation throughout the cloud architecture. This capability may be used for maintaining synchronicity, ensuring effective command execution, and facilitating seamless collaboration across the multi-tier multi-cloud environment.

Figure 6:
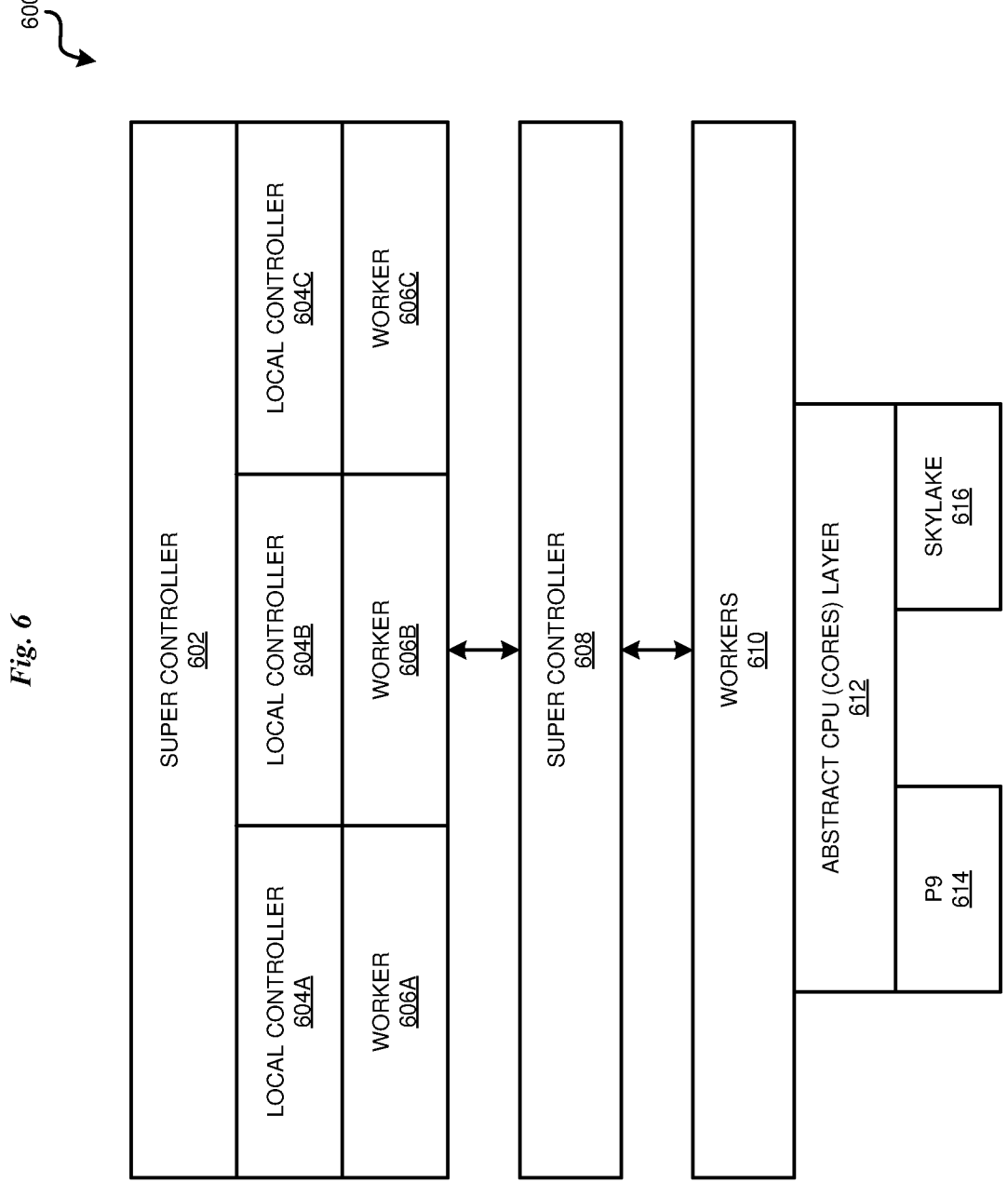
FIG. 6 depicts a block diagram of an example diagram of a multi-tier hybrid multi-cloud service management architecture in accordance with an illustrative embodiment.

With reference to FIG. 6, this figure depicts an example diagram of a multi-tier hybrid multi-cloud service management architecture in accordance with an illustrative embodiment 600.

As shown in FIG. 6, a multi-tier hybrid multi-cloud service management architecture may comprise a three-tier architecture, as illustrated by super controller 602, local controllers 604a, 604b, and 604c, and workers 606a, 606b, and 606c.

The top tier, represented by the super controller 602, may signify the highest level of authority in its architecture. The super controller may manage overall orchestration and workload distribution across multiple cloud environments. It may initiate from any preferred cloud location in the participating multi-cloud environment and can be dynamically selected depending on the current state of each participating cloud. The role of the super controller may extend beyond a single cloud, effectively coordinating the local controllers of diverse cloud environments and ensuring cohesive operation across the hybrid multi-cloud architecture.

The middle tier consists of the local controllers, 604a, 604b, and 604c, denoting authority within the individual cloud environments. These local controllers may be capable of managing the resources within their own specific cloud, maintaining the essential control plane within their defined environment. They may be the immediate contact points for the workers within their cloud and have the responsibility of managing these worker nodes based on the directives received from the super controller.

The bottom tier is occupied by workers, represented by 606a, 606b, and 606c. Workers may form the execution arm of the architecture, running applications and workloads designated to them by their respective local controllers. They could be spread across multiple clouds and can come from the same cloud where the super controller is resident, or they could be from a different cloud.

As further shown in FIG. 6, super controllers of separate cloud environments may interact amongst one another, as shown by interactions between super controller 602 and super controller 608. The interaction between these super controllers, the uppermost tier of authority in their respective cloud environments, may allow for the coordination of workload distribution and resource management across disparate cloud environments, achieving a cohesive and interconnected operation across the entire multi-cloud infrastructure.

Super controller 602, for instance, could be managing a public cloud environment, while super controller 608 could be orchestrating a private cloud or another public cloud environment. Their interaction may create a seamless, interconnected hybrid multi-cloud network. This layer of communication may not only aid in distributing computational tasks efficiently based on resource availability and workload requirements but may also enable high-level strategic decisions regarding overall system health, load balancing, and failure recovery across multiple cloud environments.

As further shown in FIG. 6, a super controller may interact directly with workers of a cloud environment. These interactions may occur regardless of whether local controllers are included in a particular environment or not. This direct engagement between the super controller and the workers is exemplified by the interactions between super controller 608 and the workers 610, with the latter incorporating an abstract CPU (cores) layer 612, P9 processor 614, and Skylake processor 616. It is to be understood that a worker may comprise other components, however, and those shown are intended to be illustrative only.

The abstract CPU (cores) layer 612, P9 processor 614, and Skylake processor 616 represent different computational resources within the workers 610. Super controller 608's direct interaction with these resources may allow for greater flexibility and efficiency in managing tasks across various computational capacities and capabilities. For example, Skylake processor 616, a high-performance computing resource, could be leveraged for computationally intensive tasks, while P9 processor 614 could handle routine tasks, all under the control and direction of super controller 608 (or a local controller).

Figure 7:
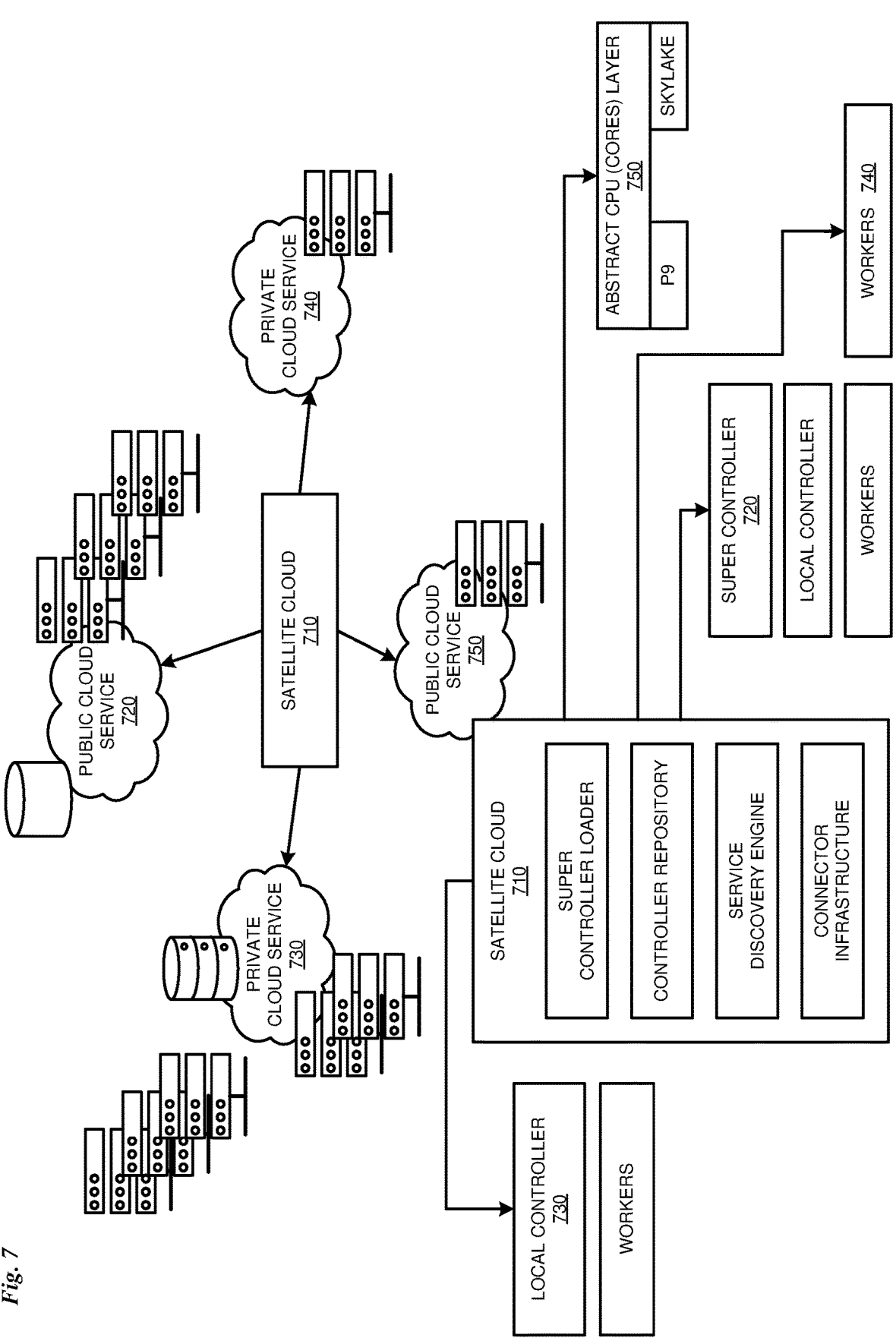
FIG. 7 depicts a block diagram of an example diagram of a multi-tier hybrid multi-cloud service management architecture in accordance with an illustrative embodiment.

With reference to FIG. 7, this figure depicts an example diagram of a multi-tier hybrid multi-cloud service management architecture in accordance with an illustrative embodiment 700. As shown, the multi-tier hybrid multi-cloud service management architecture may comprise a satellite cloud, such as satellite cloud 710, and multiple cloud environments, such as cloud environments 720, 730, 740, and 750.

As shown, satellite cloud 710 may comprise a super controller loader, a controller repository, a service discovery engine, and a connector infrastructure. The super controller loader may be used to initialize and configure the super controller. As a part of its role, it can load the necessary configurations and operational parameters that guide the super controller's actions in orchestrating various tasks across local controllers and worker nodes in multiple cloud environments.

Another component within the satellite cloud 710 may be a controller repository. The controller repository may be a database that maintains a record the super controllers, local controllers, and workers across the connected cloud environments. It can track details such as their current statuses, processing capabilities, and workloads. By updating this repository, the system may ensure optimal resource allocation and workload distribution among the local controllers and workers.

A service discovery engine may be another component of the satellite cloud 710. The service discovery engine may be responsible for discovering and keeping track of the various resources and services running within the cloud environments. For example, it may identify local controllers and workers within the cloud environments. As another example, it may identify which local controllers and workers are managing specific microservices, thus enabling the super controller to efficiently orchestrate tasks and direct workloads where they can be best processed.

Further, satellite cloud 710 may comprise a connector infrastructure. The connector infrastructure may provide the necessary framework for establishing and maintaining communication links between different cloud environments. In some embodiments, the super controller may utilize the connector infrastructure to transmit resource allocation requests to local controllers and workers. By facilitating secure and efficient inter-cloud connections, the connector infrastructure may enable the super controller to effectively extend services and allocate resources across various clouds.

As further shown in FIG. 7, a cloud environment in the multi-tier multi-cloud architecture may include a super controller, one or more local controllers, and one or more workers, as illustrated by cloud environment 720. As previously discussed, the super controller may act as the overarching authority of the architecture, managing and orchestrating tasks across multiple cloud platforms. It may oversee and direct the local controllers and worker nodes, optimizing resource allocation and workload distribution based on the current status and processing capabilities of these components.

In addition to the super controller, the cloud environment 720 incorporates one or more local controllers. The local controllers may operate under the direction of the super controller and may be responsible for the management of tasks within their specific cloud environment. They may manage a set of worker nodes and the services running on them.

The cloud environment 720 comprises one or more worker nodes. These workers may execute specific tasks assigned to them by the local controllers or the super controller. They can host and manage a variety of microservices, contributing to the wide range of capabilities offered by the cloud environment.

Moreover, a cloud environment in the multi-tier multi-cloud architecture may include one or more local controllers and one or more workers, without a super controller in that cloud environment, as illustrated by cloud environment 730. This scenario may arise, for example, in a situation where a local controller in the cloud environment is not selected to be a super controller. In such cases, the cloud environment may be at the direction of the super controller by virtue of its non-super controller status.

Additionally, a cloud environment in the multi-tier multi-cloud architecture may include one or more workers, without a local controller or a super controller in that cloud environment, as illustrated by cloud environment 740. This configuration might be utilized in an environment where workers are designed to operate independently or are managed by a super controller residing in a different cloud environment.

Furthermore, a cloud environment in the multi-tier multi-cloud architecture may include computing resources such as one or more abstract CPU (cores) layers, comprising one or more computing processors (e.g., P9 processors or Skylake processors), as illustrated by cloud environment 750. The components may provide the raw processing power that drives the services and operations within the cloud environment.

As further shown in FIG. 7, the super controller of cloud environment 720 may interact with other cloud environments through satellite cloud 710. This interaction may represent the interconnected nature of the multi-tier multi-cloud architecture, where the super controller can orchestrate tasks and resources not only within its own cloud environment but also across different cloud environments. This super controller interaction showcases the capability of the architecture to leverage resources and distribute tasks across multiple cloud platforms, thereby maximizing efficiency and productivity. Other methods of communication between a super controller and local controllers or workers may be employed, however, as would be appreciated by those having ordinary skill in the art upon reviewing the present disclosure.

Figure 8:
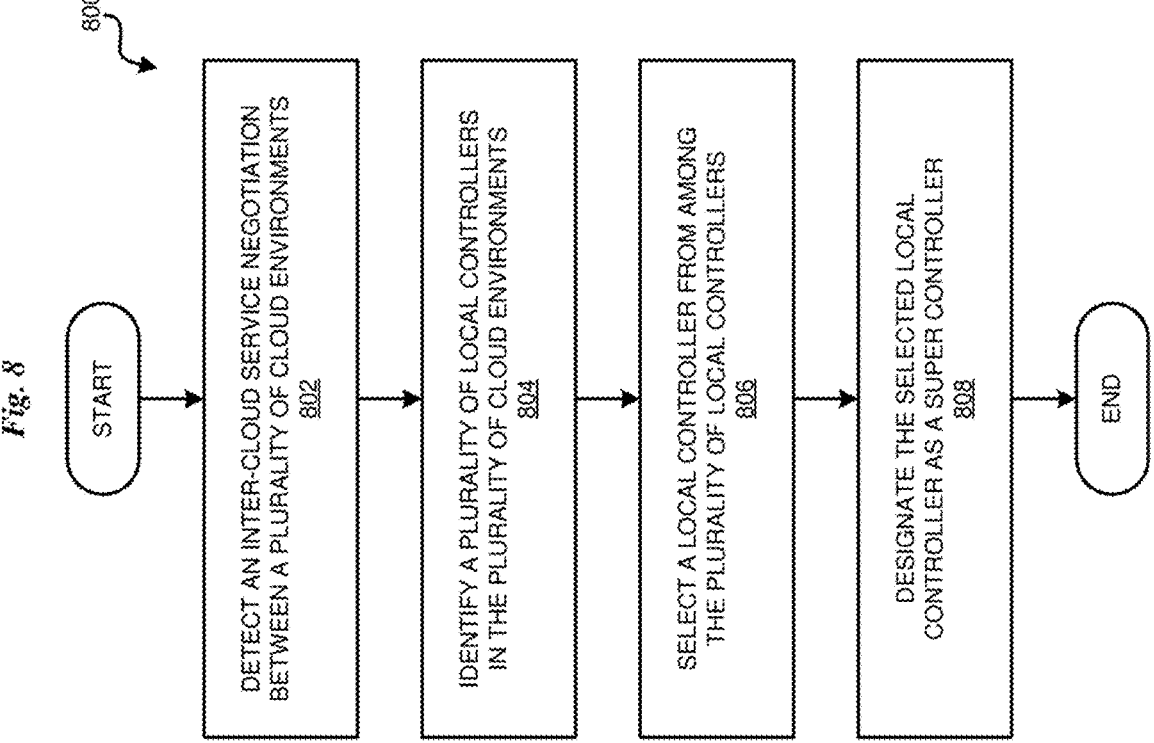
FIG. 8 depicts a block diagram of an example process for managing a multi-tier multi-cloud architecture in accordance with an illustrative embodiment.

With reference to FIG. 8, this figure depicts a block diagram of an example process for managing a multi-tier multi-cloud architecture in accordance with an illustrative embodiment 800. The example block diagram of FIG. 8 may be implemented using multi-cloud service manager 200 of FIG. 1.

In the illustrative embodiment, at block 802, the process detects an inter-cloud service negotiation between a plurality of cloud environments. In some embodiments, the inter-cloud service negotiation indicates an interaction between the plurality of cloud environments. At block 804, the process identifies a plurality of local controllers in the plurality of cloud environments. In some embodiments, a local controller in the plurality of local controllers manages a worker. At block 806, the process selects a local controller from among the plurality of local controllers. At block 808, the process designates the selected local controller as a super controller. In some embodiments, the super controller manages one or more other local controllers in the plurality of local controllers. It is to be understood that steps may be skipped, modified, or repeated in the illustrative embodiment. Moreover, the order of the blocks shown is not intended to require the blocks to be performed in the order shown, or any particular order.

With reference to FIG. 9, this figure depicts a block diagram of an example process for managing a multi-tier multi-cloud architecture in accordance with an illustrative embodiment 900. The example block diagram of FIG. 9 may be implemented using multi-cloud service manager 200 of FIG. 1.

In the illustrative embodiment, at block 902, the process performs, by a super controller of a plurality of cloud environments, service discovery to identify a plurality of local controllers and a plurality of workers in the plurality of cloud environments. At block 904, the process selects by the super controller, responsive to receiving a service request for an allocation of resources, a local controller in the plurality of local controllers. At block 906, the process transmits, by the super controller to the selected local controller, an allocation request for the allocation of resources. It is to be understood that steps may be skipped, modified, or repeated in the illustrative embodiment. Moreover, the order of the blocks shown is not intended to require the blocks to be performed in the order shown, or any particular order.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

detecting, by a multi-cloud service manager, an inter-cloud service negotiation between a plurality of cloud environments, the inter-cloud service negotiation indicating an interaction between the plurality of cloud environments;

identifying, by the multi-cloud service manager, a plurality of local controllers in the plurality of cloud environments, a local controller in the plurality of local controllers being a computer control node configured to manage resources associated with a cloud environment in the plurality of cloud environments including a worker, and the worker being a computer execution node configured to execute tasks using resources associated with the cloud environment;

selecting, by the multi-cloud service manager, a first local controller from among the plurality of local controllers based on a performance metric of the first local controller;

designating, by the multi-cloud service manager, the first local controller as a super controller, the super controller being configured to manage resources associated with the plurality of cloud environments including the plurality of local controllers and to coordinate operations of the plurality of local controllers; and selecting, by the multi-cloud service manager, a second local controller from among the plurality of local controllers;

designating, by the multi-cloud service manager, the second local controller as a second super controller;

de-designating, by the multi-cloud service manager, the first local controller as a super controller; and updating, by the multi-cloud service manager, a controller repository.

2. The computer-implemented method of claim 1, wherein the performance metric includes at least one of a workload, a processing capability, and a service accessibility.

3. The computer-implemented method of claim 1, further comprising performing, by the multi-cloud service manager, service discovery in the plurality of cloud environments.

4. The computer-implemented method of claim 3, wherein performing service discovery includes identifying the plurality of local controllers and a plurality of workers in the plurality of cloud environments.

5. The computer-implemented method of claim 3, further comprising updating, by the multi-cloud service manager responsive to the performing service discovery, the controller repository.

6. The computer-implemented method of claim 1, further comprising transmitting, by the multi-cloud service manager, to a third local controller in the plurality of local controllers, responsive to the super controller selecting the third local controller for an allocation of resources, an allocation request.

7. The computer-implemented method of claim 1, further comprising transmitting, by the multi-cloud service manager to a second worker in the plurality of cloud environments, responsive to the super controller selecting the second worker for an allocation of resources, an allocation request.

8. The computer-implemented method of claim 1, wherein updating the controller repository includes merging a first service discovery record associated with the de-designated super controller and a second service discovery record associated with the second super controller.

9. A computer program product comprising one or more computer readable storage media, and program instructions collectively stored on the one or more computer readable storage media, the program instructions executable by a processor to cause the processor to perform operations comprising:

detecting, by a multi-cloud service manager, an inter-cloud service negotiation between a plurality of cloud environments, the inter-cloud service negotiation indicating an interaction between the plurality of cloud environments;

identifying, by the multi-cloud service manager, a plurality of local controllers in the plurality of cloud environments, a local controller in the plurality of local controllers being a computer control node configured to manage resources associated with a cloud environment in the plurality of cloud environments including a worker, and the worker being a computer execution node configured to execute tasks using resources associated with the cloud environment;

selecting, by the multi-cloud service manager, a first local controller from among the plurality of local controllers based on a performance metric of the first local controller;

designating, by the multi-cloud service manager, the first local controller as a super controller, the super controller being configured to manage resources associated with the plurality of cloud environments including the plurality of local controllers and to coordinate operations of the plurality of local controllers; and selecting, by the multi-cloud service manager, a second local controller from among the plurality of local controllers;

designating, by the multi-cloud service manager, the second local controller as a second super controller;

de-designating, by the multi-cloud service manager, the first local controller as a super controller; and updating, by the multi-cloud service manager, a controller repository.

10. The computer program product of claim 9, wherein the performance metric includes at least one of a workload, a processing capability, and a service accessibility.

11. The computer program product of claim 9, further comprising transmitting, by the multi-cloud service manager, to a third local controller in the plurality of local controllers, responsive to the super controller selecting the third local controller for an allocation of resources, an allocation request.

12. The computer program product of claim 9, further comprising transmitting, by the multi-cloud service manager to a second worker in the plurality of cloud environments, responsive to the super controller selecting the second worker for an allocation of resources, an allocation request.

13. A computer system comprising a processor and one or more computer readable storage media, and program instructions collectively stored on the one or more computer readable storage media, the program instructions executable by the processor to cause the processor to perform operations comprising:

detecting, by a multi-cloud service manager, an inter-cloud service negotiation between a plurality of cloud environments, the inter-cloud service negotiation indicating an interaction between the plurality of cloud environments;

identifying, by the multi-cloud service manager, a plurality of local controllers in the plurality of cloud environments, a local controller in the plurality of local controllers being a computer control node configured to manage resources associated with a cloud environment in the plurality of cloud environments including a worker, and the worker being a computer execution node configured to execute tasks using resources associated with the cloud environment;

selecting, by the multi-cloud service manager, a first local controller from among the plurality of local controllers based on a performance metric of the first local controller;

designating, by the multi-cloud service manager, the first local controller as a super controller, the super controller being configured to manage resources associated with the plurality of cloud environments including the plurality of local controllers and to coordinate operations of the plurality of local controllers; and selecting, by the multi-cloud service manager, a second local controller from among the plurality of local controllers;

designating, by the multi-cloud service manager, the second local controller as a second super controller;

de-designating, by the multi-cloud service manager, the first local controller as a super controller; and updating, by the multi-cloud service manager, a controller repository.

14. The computer system of claim 13, wherein the performance metric includes at least one of a workload, a processing capability, and a service accessibility.

15. The computer system of claim 13, further comprising transmitting, by the multi-cloud service manager, to a third local controller in the plurality of local controllers, responsive to the super controller selecting the third local controller for an allocation of resources, an allocation request.

16. The computer system of claim 13, further comprising transmitting, by the multi-cloud service manager to a second worker in the plurality of cloud environments, responsive to the super controller selecting the second worker for an allocation of resources, an allocation request.

17. A computing environment comprising:

a shared pool of configurable computing resources;

at least one data processing system included in the configurable computing resources, the at least one data processing system comprising a processor unit and a data storage unit;

a service delivery model to deliver on-demand access to the shared pool of resources;

a metering capability to measure a service delivered via the service delivery model; and program instructions collectively stored on one or more computer readable storage media, the program instructions executable by the processor unit to cause the processor unit to perform operations comprising:

detecting, by a multi-cloud service manager, an inter-cloud service negotiation between a plurality of cloud environments, the inter-cloud service negotiation indicating an interaction between the plurality of cloud environments;

identifying, by the multi-cloud service manager, a plurality of local controllers in the plurality of cloud environments, a local controller in the plurality of local controllers being a computer control node configured to manage resources associated with a cloud environment in the plurality of cloud environments including a worker, and the worker being a computer execution node configured to execute tasks using resources associated with the cloud environment;

selecting, by the multi-cloud service manager, a first local controller from among the plurality of local controllers based on a performance metric of the first local controller;

designating, by the multi-cloud service manager, the first local controller as a super controller, the super controller being configured to manage resources associated with the plurality of cloud environments including the plurality of local controllers and to coordinate operations of the plurality of local controllers; and selecting, by the multi-cloud service manager, a second local controller from among the plurality of local controllers;

designating, by the multi-cloud service manager, the second local controller as a second super controller;

de-designating, by the multi-cloud service manager, the first local controller as a super controller; and updating, by the multi-cloud service manager, a controller repository.

18. The computing environment of claim 17, wherein the performance metric includes at least one of a workload, a processing capability, and a service accessibility.

19. The computing environment of claim 17, further comprising transmitting, by the multi-cloud service manager, to third local controller in the plurality of local controllers, responsive to the super controller selecting the third local controller for an allocation of resources, an allocation request.

20. The computing environment of claim 17, further comprising transmitting, by the multi-cloud service manager to a second worker in the plurality of cloud environments, responsive to the super controller selecting the second worker for an allocation of resources, an allocation request.

21. A software service delivery architecture comprising:

a shared pool of configurable computing resources;

at least one data processing system included in the shared pool of configurable computing resources, the at least one data processing system comprising a processor unit and a data storage unit;

at least one data networking component configured to enable data communication with the at least one data processing system;

an application control mechanism to execute a software application that is deployed to execute using the at least one data processing system; and program instructions of the software application, wherein the program instructions are executable by the processor unit to cause the processor unit to perform operations comprising:

detecting, by a multi-cloud service manager, an inter-cloud service negotiation between a plurality of cloud environments, the inter-cloud service negotiation indicating an interaction between the plurality of cloud environments;

identifying, by the multi-cloud service manager, a plurality of local controllers in the plurality of cloud environments, a local controller in the plurality of local controllers being a computer control node configured to manage resources associated with a cloud environment in the plurality of cloud environments including a worker, and the worker being a computer execution node configured to execute tasks using resources associated with the cloud environment;

selecting, by the multi-cloud service manager, a first local controller from among the plurality of local controllers based on a performance metric of the first local controller;

designating, by the multi-cloud service manager, the first local controller as a super controller, the super controller being configured to manage resources associated with the plurality of cloud environments including the plurality of local controllers and to coordinate operations of the plurality of local controllers; and selecting, by the multi-cloud service manager, a second local controller from among the plurality of local controllers;

designating, by the multi-cloud service manager, the second local controller as a second super controller;

de-designating, by the multi-cloud service manager, the first local controller as a super controller; and updating, by the multi-cloud service manager, a controller repository.

22. The software service delivery of claim 21, wherein the performance metric includes at least one of a workload, a processing capability, and a service accessibility.

23. The software service delivery of claim 21, further comprising transmitting, by the multi-cloud service manager to a second worker in the plurality of cloud environments, responsive to the super controller selecting the second worker for an allocation of resources, an allocation request.

* * * * *